United States Patent Office 3,421,182
Patented Jan. 14, 1969

3,421,182
SCREW PRESS FOR EXTRUDING PLASTIC MATERIALS
Roberto Colombo, Turin, Italy, assignor to S.p.A. Lavorazione Materie Plastiche L.M.P., Turin, Italy
Filed Nov. 8, 1966, Ser. No. 592,781
Claims priority, application Italy, Nov. 13, 1965, 25,688/65
U.S. Cl. 18—12          2 Claims
Int. Cl. B29f 3/08

ABSTRACT OF THE DISCLOSURE

In a screw press having conically tipped screws for extruding plastic, in order to prevent scorching of the plastic material at a high extrusion rate, an internal cooling system is provided in each screw, for preferentially cooling the conical tip and at least the last turns on the metering section of the screw.

---

The invention relates to screw presses for extruding plastic materials, more particularly thermoplastic resins such as polyvinyl chloride, polypropylene and the like.

Heretofore one of the most serious problems in this field has been encountered in obtaining the maximum possible capacity from a given press without the risk of scorching the material, such scorching being particularly likely when the material contains a low percentage of lubricant or no lubricant at all.

It is known that scorching is chiefly caused by the heat developed as a result of friction in the material as it is being processed in the press. The greatest risk of scorching has heretofore been believed to occur at those press sections where the press screws and barrel contact solid particles of the material, these sections being those just ahead or "upstream" of the so-called metering section. Cooling of this section, and more particularly of the intermediate regions at which the thermoplastic powder has already undergone a substantial compression, has therefore been resorted to and this has been achieved by circulating a coolant within each screw. Moreover, the material has not been subjected to any drastic treatment, such as high pressure or temperature elevations per unit length of the barrel, while it still contains a substantial proportion of solids.

These measures, however, are found to be of only very limited value, quite apart from the fact that they are objectionable as they necessitate screws of considerable length.

The present invention is based on the discovery that the main cause for scorching of the material in screw extruders is not necessarily the friction of the solid particles of the material against the press members. This discovery followed the observation that, as the rotational speed of the screw is increased, the extruded material exhibits scorching of a steadily increasing degree, even though the press sections operating on the still solid material are cooled to a correspondingly increased extent.

Thus, it was ascertained that in fact it is the screw tips and the screw turns in the metering section that are mainly responsible for scorching, it being irrelevant whether the press comprises one screw only or a plurality of intermeshing concordantly or counter rotating screws. In this connection it should be noted that in presses with counter-rotating screws a subordinate cause contributes to the main cause of scorching mentioned above, this resulting from pinching of material between the screws and the consequent inherent shearing effect which is peculiar to counter-rotating screws.

It is thus an object of the present invention to provide a press of the type described wherein scorching is minimized.

According to a further object, the invention provides a screw press for extruding plastic materials comprising at least one screw sealingly rotatable in a barrel and terminating at one end in a substantially conical tip, the tip and at least some screw turns adjacent thereto being cooled from the inside by circulation of a coolant.

By "sealingly rotatable" applicant means that the screw is rotatable in the barrel and so dimensioned with respect thereto that free passage through the barrel of the material with which the press is used is prevented.

This and other objects and advantages of the invention will be clear from the following description, given with reference to the accompanying drawings which are by way of example and in which.

Figure 1:
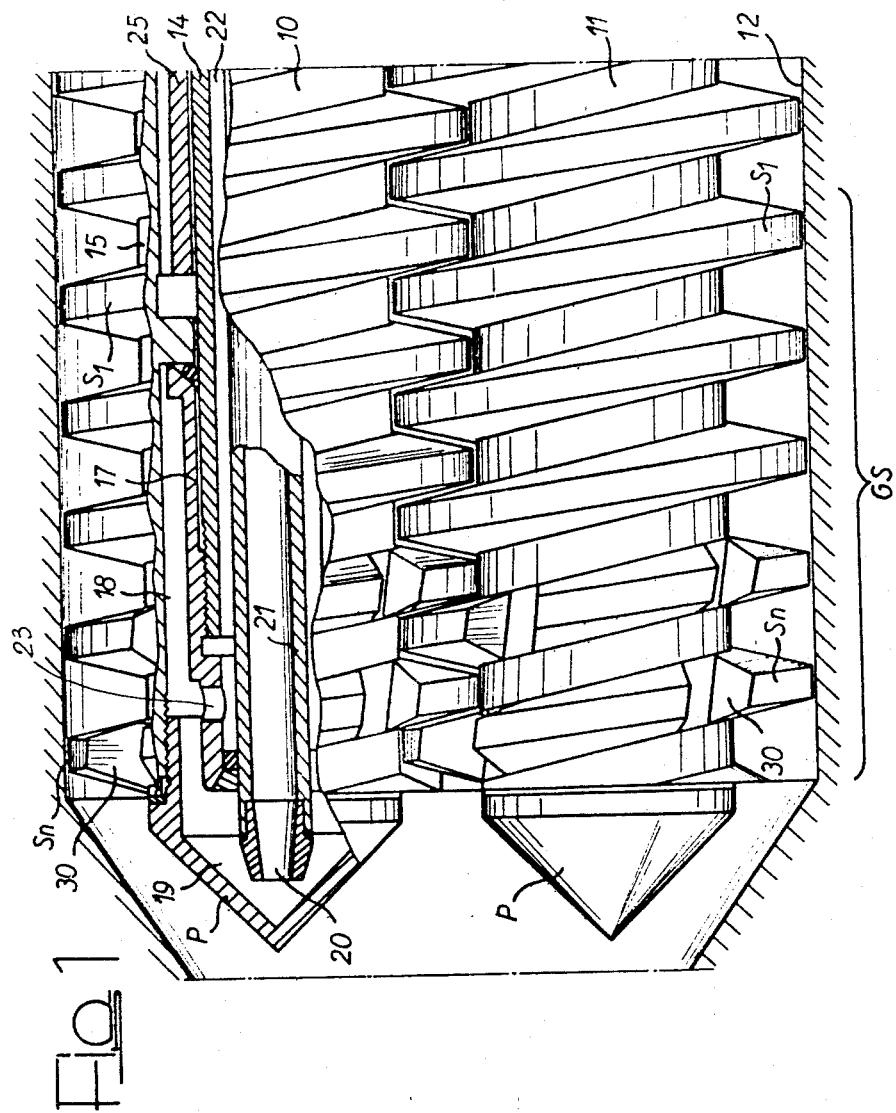
FIG. 1 is a view, partly broken away, of the forward portion of a double-screw press according to the invention.

The two screws 10, 11 shown in the drawings revolve in the same direction within a common barrel 12. The screw axes extend parallel to each other and the screw threads intermesh so as to form a substantial seal against free passage of the processed material, such seal being in accordance with known principles. The two screws are similar in structure, so that the features described hereinafter with reference to one screw apply also to the other screw.

As used herein the term "rear" is intended to mean remote from the screw tip and thus "upstream" thereof as regards material flow.

In all known screw presses for extruding thermoplastic resins, the material is fed to the rear barrel end and travels within the barrel through various processing stations (for instance, compression, mixing and degasifying stations). These stations are variously combined with one another and are so arranged as to cause the material to reach an extrusion die in a homogeneous gelatinous state. Such an extruder generally includes a metering section which comprises a small number of forward end turns on each screw, followed by an at least substantially conical tip at which the screw core ends.

In FIG. 1 such a metering section is denoted GS and comprises five turns, the conical tips of each screw being denoted P.

In practice it is common in the art to form the screws from a number of tubular sections, fitted and axially clamped on a central mandrel.

In FIG. 1 there is shown at the fragmented region, a tubular mandrel 14, and a section 15, the latter being provided with the metering turns and axially clamped on the said mandrel 14 by a cap 17 which is screwed on the screw-threaded forward mandrel end. The cap 17 is fully received within a recess in the section 15 and forms, together with the core of the latter, a cooling jacket 18 which is included within the length of the metering section GS. The screw tip P is hollow, containing a recess 19 and is screwed tight into the forward end of the section 15, so that the recess 19 connects with the forward end of the jacket 18.

The forward end of a metal tube 21 is of nozzle shape 20 and opens into the tip recess 19. The tube 21 extends axially through the mandrel 14 and supplies a coolant, such as a mineral oil, to the recess 19 and jacket 18. For this purpose the tube 21 extends fluid-tight through the end of the cap 17 and defines, together with the latter and the mandrel 14, an annular passage 22 for return of the coolant fluid to its source.

The jacket 18 connects with the passage 22 through a circumferential row of holes 23 bored in the cap 17. An important feature of the specific embodiment of the invention illustrated is that the holes 23 are situated relatively near to the forward end of the jacket 18 and adjacent the recess 19 in the tip P, instead of at the rear jacket end as might at first appear the obvious position for them. The latter arrangement is of course not outside the scope of the invention but a "partly blind" jacket, as shown, is advantageous in that in such a case the cooling effect of the coolant is concentrated at the tip P and at the directly adjacent screw turns. The cooling effect is thus moderate at the region of the metering turns surrounding the rear end of the jacket 18 where coolant circulation is only indirectly induced. The first metering turn, denoted $S_1$, is in fact and as shown, clear of the jacket 18, so that it is generally conduction-cooled through the metal of the screw core.

The main reason for adoption of the described arrangement is that, as has been experimentally ascertained, at the boundary layer of contact between the melted material and the screw, considerable quantities of friction induced heat are evolved. In the absence of effective cooling this heat converts the boundary layer into a carbonaceous layer which is disintegrated over a period of time and which is replaced by further melted material, and so on. This process is particularly prevalent at the tip P and the last metering turn (denoted $S_n$), the preceding metering turn being conveniently only moderately cooled to avoid disturbing the metering process. In practice, the coolant which returns to the coolant source through the clearance 22 is so hot that it is practically without cooling effect on the screw sections behind the sections GS. It has been found that such cooling would be not only superfluous but would even be objectionable as it would adversely affect the capacity of the extruder. Where necessary it may therefore be advisable to interpose, between the mandrel 14 and the screw sections mounted thereon, a heat-insulating layer and such a layer is denoted 25 in FIG. 1.

A further feature which may be advantageously adopted in addition to those previously described consists in an arrangement whereby the material in the region where the abovementioned boundary layer might form is steadily agitated to prevent formation of a stationary boundary layer. To this end at least the last metering turn $S_n$ is formed with a number of notches 30 which equal in depth the height H of the turn. These may be most clearly seen from FIG. 3. In operation, a flow of melted material is established through each notch and this disturbs the material being conveyed by the channels 31 (see FIG. 2) between which exist each two adjacent screw turns. The flow finally impinges upon the region of the tip P, effecting such displacement of the material that the formation of an overheated stationary boundary layer is rendered impossible.

Figure 2:
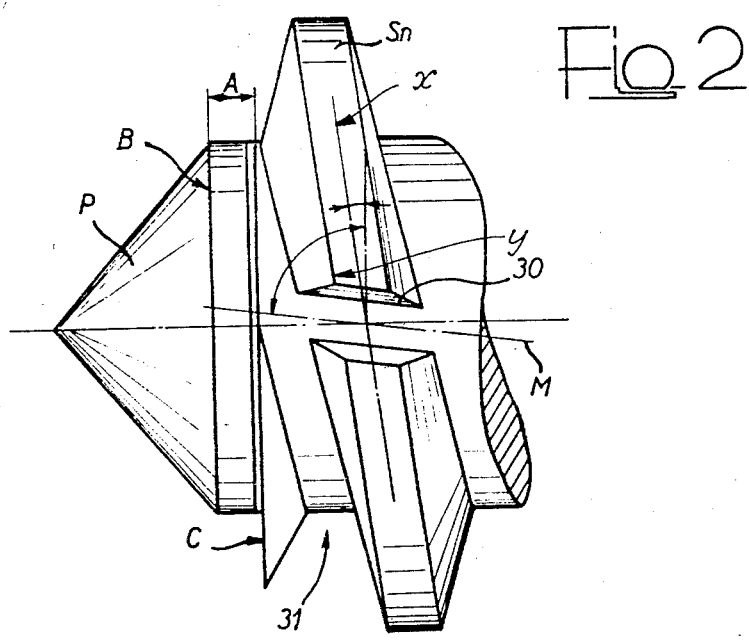
FIG. 2 is a detailed view of a screw part showing a number of geometrical relationships.
Figure 3:
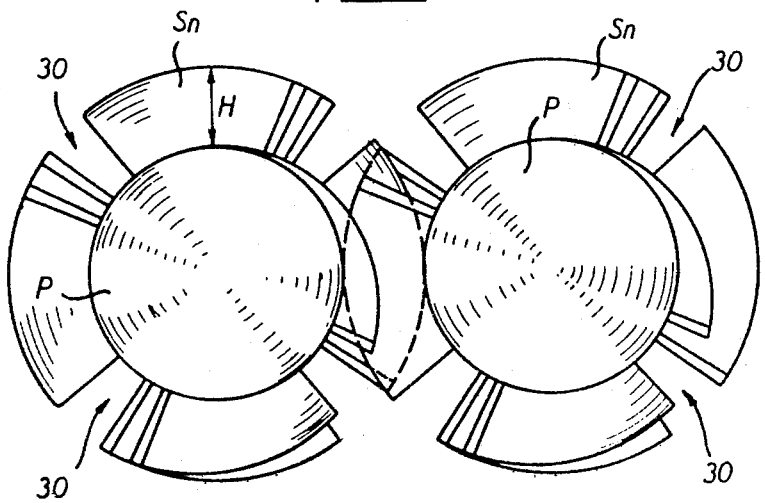
FIG. 3 is a front view of the two screws shown in FIG. 1.

It has been found that the following requirements should be met in order to obtain an optimum result:

Firstly, the number of notches in each screw turn should be at least three and the total area of the notches as seen in a front projection should not exceed the projected area of the remaining portions of the turn. Furthermore, the spacing A (see FIG. 2) between the base circumference B of the tip P and the terminal plane C of the last metering turn $S_n$ should not exceed the pitch of this turn and should preferably be smaller than half the said pitch. Still further, and assuming $x$ to be the helix angle of the screw turn, the middle axis M of each notch (see FIG. 2) should be disposed at an angle $y$ to the radial plane of the mandrel by between in the order of 60° and the complement to 90° of the said angle $x$. In FIG. 2 the helix angle of the axis M equals 90°−$x$.

Notches similar to the notches 30 in the turn $S_n$ may be formed also in the penultimate metering turn and possibly also in the third from last said turn. It should, moreover, be borne in mind that the presence of such notches result also in an undesirable effect, namely increased friction in the channels 31 between the turns. For this reason the number of turns including notches should conveniently be limited to the lowest strictly essential number, and this feature should be combined with the provision of cooling, as previously described, for the tip P and metering turns.

Various modifications of the invention are of course possible within the scope of the appended claims.

What I claim is:

1. A screw press for extruding plastic and preventing scorching of the plastic material extruded at a high extrusion rate, the screw press comprising; a barrel, two similar and concordantly rotating intermeshing screws, the screws being sealingly rotatable in the barrel and each terminating at one end in a substantially conical tip, a coolant supply pipe extending axially within each screw, the supply pipe opening adjacent a hollow tip of the screw, a coolant return tube within each screw, a coolant return opening intermediate a cooling region of at least some screw turns adjacent to each screw tip, a coolant chamber defined by the hollow conical tip and annular region surrounding the coolant supply pipe and coolant return tube, the coolant chamber extending into each screw under at least some screw turns adjacent the screw tip, the screw turn adjacent to the tip of each screw formed with notches having a radial depth substantially equaling the height of the turn, and further wherein the screw turn adjacent the conical tip terminates in a plane perpendicular to the axis of the screw spaced a distance from a base of the conical tip, the spacing distance being less than the pitch of a turn of the screw helix of each screw.

2. A screw press as defined in claim 1 wherein the helix angle of the middle axis of each notch is in the order of between 60° and the complement of 90° of the helix angle of the turn.

References Cited

UNITED STATES PATENTS

| | | | |
|---|---|---|---|
| 2,449,355 | 9/1948 | Wiley et al. | 18—12 |
| 2,631,016 | 3/1953 | De Laubarede | 18—12 |
| 2,632,203 | 3/1953 | De Laubarede | 18—12 X |
| 3,252,182 | 5/1966 | Colombo | 18—12 |
| 3,283,041 | 11/1966 | Sommersfeld | 18—12 |
| 3,310,836 | 3/1967 | Nichols. | |
| 3,331,100 | 7/1967 | Gould | 18—12 |

WILLIAM J. STEPHENSON, *Primary Examiner.*